United States Patent
Yang et al.

(10) Patent No.: US 12,526,176 B2
(45) Date of Patent: Jan. 13, 2026

(54) TRANSMISSION CIRCUIT, TRANSMISSION METHOD AND TRANSMISSION AND RECEPTION SYSTEM

(71) Applicant: FITIPOWER INTEGRATED TECHNOLOGY INC., Hsinchu (TW)

(72) Inventors: Cheng-Wei Yang, Hsinchu (TW); Hui-Chun Hsu, Hsinchu (TW); Chun-Liang Chen, Hsinchu (TW)

(73) Assignee: FITIPOWER INTEGRATED TECHNOLOGY INC., Hsinchu (TW)

( * ) Notice: Subject to any disclaimer, the term of this patent is extended or adjusted under 35 U.S.C. 154(b) by 0 days.

(21) Appl. No.: 18/764,191

(22) Filed: Jul. 4, 2024

(65) Prior Publication Data
US 2025/0350510 A1   Nov. 13, 2025

(30) Foreign Application Priority Data

May 7, 2024   (TW) .................................. 113116788

(51) Int. Cl.
*H04L 25/14* (2006.01)
*H03M 9/00* (2006.01)
(Continued)

(52) U.S. Cl.
CPC .............. *H04L 25/14* (2013.01); *H03M 9/00* (2013.01); *H04L 25/0278* (2013.01); *H04L 25/12* (2013.01)

(58) Field of Classification Search
CPC . H04L 7/0008; H04L 25/026; H04L 25/0264; H04L 25/0272; H04L 25/0278;
(Continued)

(56) References Cited

U.S. PATENT DOCUMENTS 6,487,250 B1   11/2002   Kato
8,290,066 B2   10/2012   Mori
(Continued)

FOREIGN PATENT DOCUMENTS

CN   107408094 A      11/2017
CN   107456273 A  *  12/2017   ......... A61B 18/1492
(Continued)

*Primary Examiner* — Young T. Tse
(74) *Attorney, Agent, or Firm* — Winston Hsu (57) ABSTRACT

A transmission circuit is used for performing transmission with a reception circuit through a positive terminal channel and a negative terminal channel. The transmission circuit includes an output stage circuit, comprising a variable output impedance circuit, coupled to the positive terminal channel and the negative terminal channel; and a driving circuit, comprising a positive output terminal and a negative output terminal, configured to output a second data signal through the variable output impedance circuit according to a first data signal, wherein the positive output terminal and the negative output terminal drive the positive terminal channel and the negative terminal channel respectively through the variable output impedance circuit; and a transition detection circuit, coupled to the output stage circuit, configured to detect whether the first data signal transitions according to a clock signal having a time period, and generate a detection result to adjust the variable output impedance circuit.

16 Claims, 10 Drawing Sheets

(51) Int. Cl.
*H04L 25/02* (2006.01)
*H04L 25/12* (2006.01)

(58) Field of Classification Search
CPC ... H04L 25/0208; H04L 25/085; H04L 25/10; H04L 25/12; H04L 25/14; H03H 7/38; H03H 7/383; H03H 2007/386; H03M 9/00
USPC ............ 375/219, 220, 257, 285, 296, 360; 333/124, 127; 343/850, 852; 370/282; 455/63.1, 67.13, 501, 502
See application file for complete search history.

(56) References Cited

U.S. PATENT DOCUMENTS

| | | | |
|---|---|---|---|
| 8,842,745 | B2 | 9/2014 | Hong |
| 9,800,821 | B2 * | 10/2017 | Choi ..................... H04N 5/63 |
| 2005/0116745 | A1 * | 6/2005 | Huang ............... H04L 25/0278 327/108 |
| 2011/0221521 | A1 | 9/2011 | Razzell |
| 2015/0381173 | A1 * | 12/2015 | Riad ................. H03K 19/0005 327/108 |
| 2016/0259702 | A1 | 9/2016 | Mishra |
| 2019/0207653 | A1 | 7/2019 | Bieber |
| 2020/0366541 | A1 * | 11/2020 | Hossain ............. H04L 27/3411 |
| 2021/0184328 | A1 * | 6/2021 | Seki ..................... H01P 1/10 |

FOREIGN PATENT DOCUMENTS

| | | |
|---|---|---|
| CN | 110022275 A | 7/2019 |
| TW | 200726081 | 7/2007 |

\* cited by examiner

TRANSMISSION CIRCUIT, TRANSMISSION METHOD AND TRANSMISSION AND RECEPTION SYSTEM

BACKGROUND OF THE INVENTION

1. Field of the Invention

The present invention relates to a transmission circuit, a transmission method and a transmission and reception system, and more particularly, to a transmission circuit, a transmission method and a transmission and reception system that reduces power consumption by determining whether data signals transition.

2. Description of the Prior Art

Serializer/Deserializer (SerDes) circuit is a circuit used to convert a single-ended bus with a large bit width into one or more differential signals, and the frequency of the differential signals is greater than the frequency of the single-ended bus with the large bit width. The SerDes circuit enables point-to-point transmission of a large amount of data while reducing parallel bus complexity, cost and printed circuit board space. However, as the processing capacity of computer systems increases, the operation frequency of the parallel bus becomes higher, causing the SerDes circuit to consume much more power. Under this circumstance, if the SerDes circuit is to be used in mobile devices that require low power consumption, it has become one of the goals of the industry to improve the power consumption of the SerDes circuit.

SUMMARY OF THE INVENTION

The present invention is to provide a transmission circuit, a transmission method and a transmission and reception system to solve the above problems.

The present invention provides a transmission circuit, for performing transmission with a reception circuit through a positive terminal channel and a negative terminal channel, the transmission circuit includes an output stage circuit, comprising: a variable output impedance circuit, coupled to the positive terminal channel and the negative terminal channel; and a driving circuit, comprising a positive output terminal and a negative output terminal, configured to output a second data signal through the variable output impedance circuit according to a first data signal, wherein the positive output terminal and the negative output terminal drive the positive terminal channel and the negative terminal channel respectively through the variable output impedance circuit; and a transition detection circuit, coupled to the output stage circuit, configured to detect whether the first data signal transitions according to a clock signal having a time period, and generate a detection result to adjust the variable output impedance circuit.

The present invention provides a transmission and reception system, comprising a channel, comprising a positive terminal channel and a negative terminal channel; a transmission circuit comprising: an output stage circuit, comprising: a variable output impedance circuit, coupled to the positive terminal channel and the negative terminal channel; and a driving circuit, comprising a positive output terminal and a negative output terminal, configured to output a second data signal through the variable output impedance circuit according to a first data signal, wherein the positive output terminal and the negative output terminal drive the positive terminal channel and the negative terminal channel respectively through the variable output impedance circuit; and a transition detection circuit, coupled to the output stage circuit, configured to detect whether the first data signal transitions according to a clock signal having a time period, and generate a detection result to adjust the variable output impedance circuit; and a reception circuit, configured to receive a third data signal through the channel according to the second data signal.

The present invention provides a transmission method, for a transmission circuit, wherein the transmission circuit transmits signals to a reception circuit through a positive terminal channel and a negative terminal channel, the transmission method comprising: receiving a first data signal and a clock signal having a time period; detecting whether the first data signal transitions and generating a detection result according to the clock signal; adjusting characteristics of the transmission circuit according to the detection result; and outputting a second data signal according to the first data signal, and transmitting the second data signal to the reception circuit as a third data signal through the positive terminal channel and the negative terminal channel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
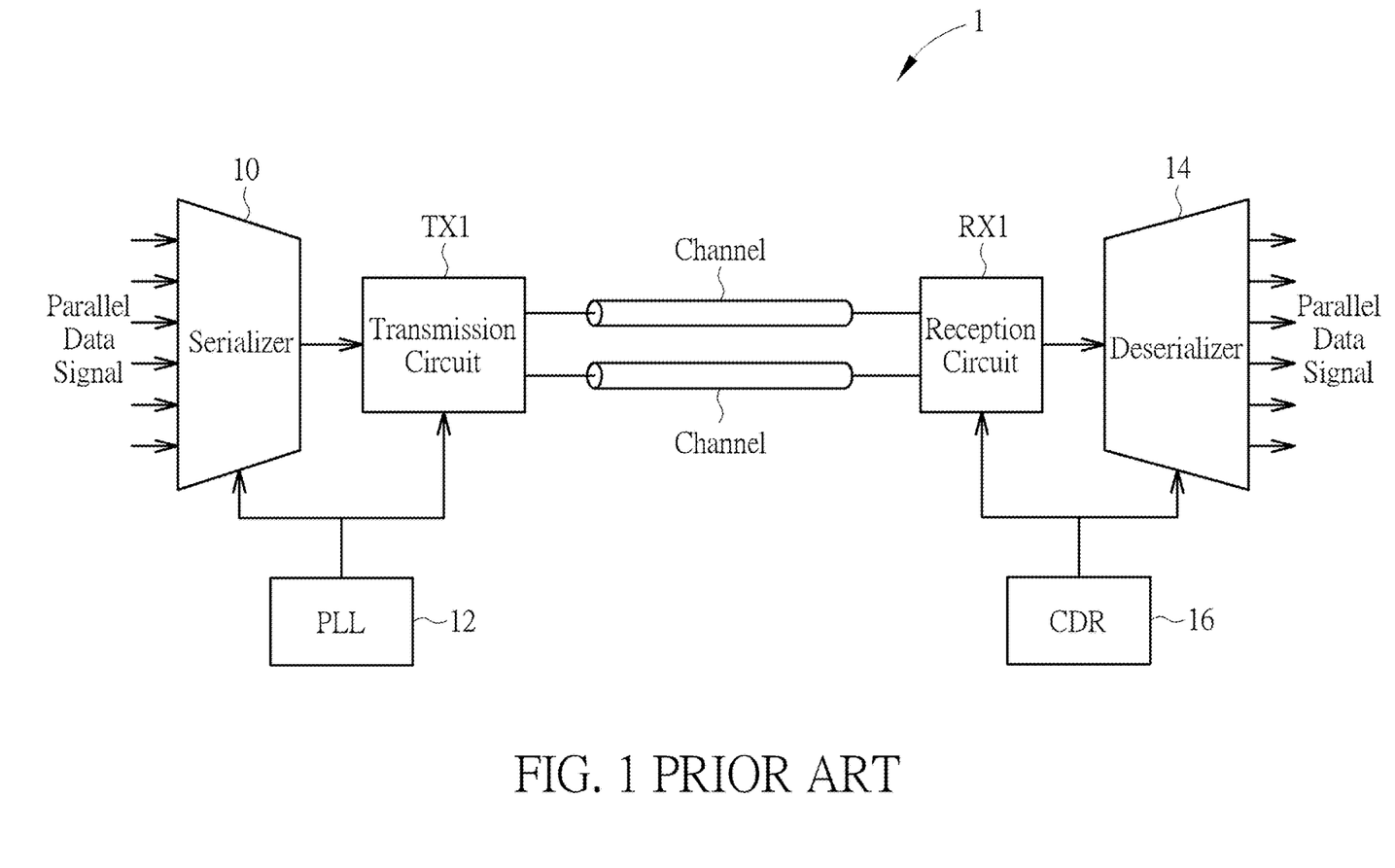
FIG. 1 is a schematic diagram of a conventional SerDes system.
Figure 2A:
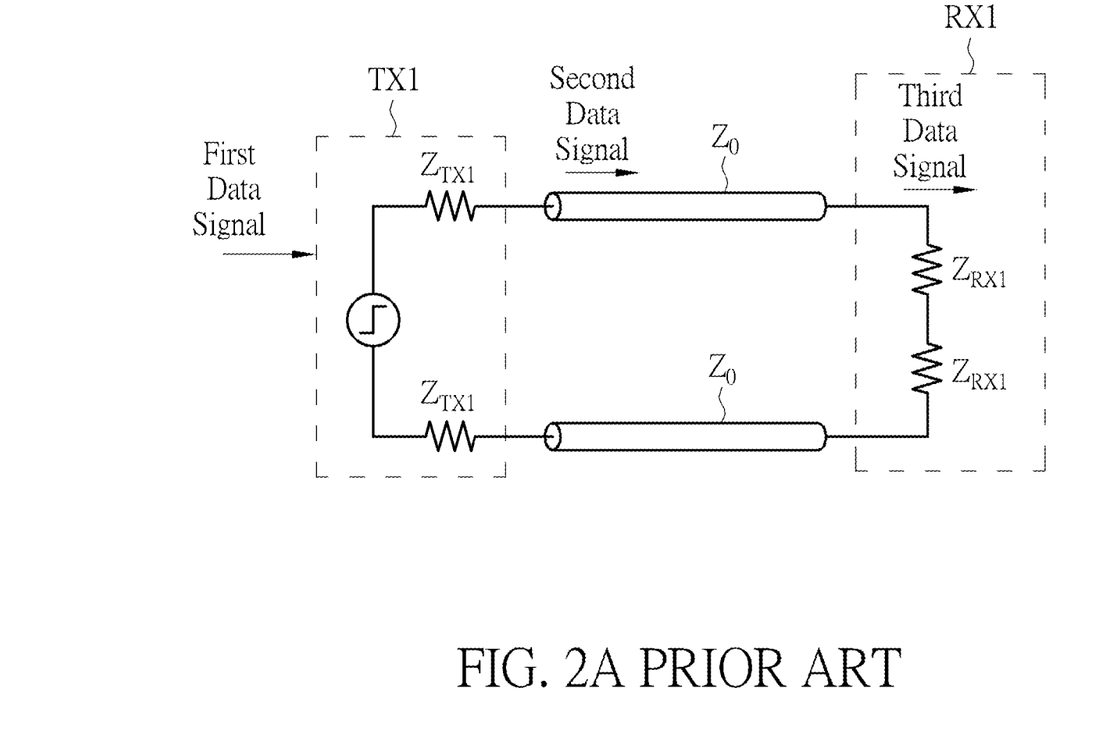
FIG. 2A is a schematic diagram of an equivalent circuit of the conventional SerDes system in FIG. 1.
Figure 2B:
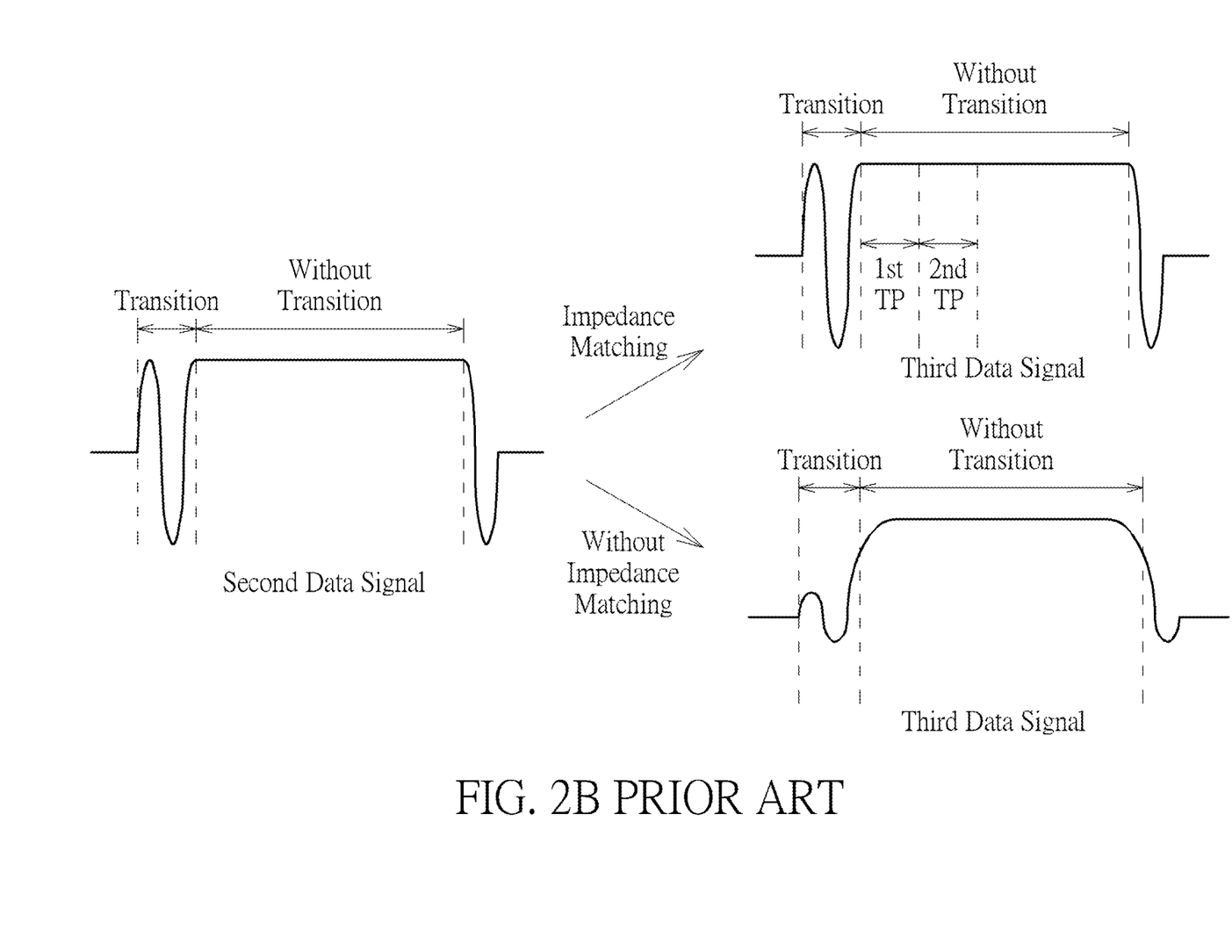
FIG. 2B is a waveform diagram of the second data signal and the third data signal in FIG. 2A.

Please refer to FIG. 1. FIG. 1 is a schematic diagram of a conventional serializer/deserializer (SerDes) system 1. The SerDes system 1 includes a serializer 10, a phase-locked loop (PLL) circuit 12, a transmission circuit TX1, a reception circuit RX1, a deserializer 14 and a clock data recovery (CDR) circuit 16. The serializer 10 is coupled to the transmission circuit TX1 and the PLL circuit 12, and is configured to convert a parallel data signal into a serial data signal according to a clock signal having a time period provided by the PLL circuit 12. The transmission circuit TX1 transmits the serial data signal to the reception circuit RX1 through the channel. The reception circuit RX1 is coupled to the CDR circuit 16 and the deserializer 14, and is configured to convert the serial data signal into the parallel data signal according to the clock signal recovered by the CDR circuit 16. The operating principle of the SerDes system 1 is well known in the art and not repeated here. It should be noted that the impedance matching is usually required between the transmission circuit TX1, the channel and the reception circuit RX1, so that the transmission of the serial data signal will not be excessively attenuated. For example, please refer to FIG. 2A. FIG. 2A is a schematic diagram of an equivalent circuit of the transmission circuit TX1, the channel and the reception circuit RX1. As shown in FIG. 2A, a first data signal (the serial data signal) becomes a second data signal after transmitting through an output impedance $Z_{TX1}$ of the transmission circuit TX1. The second data signal is transmitted through a channel impedance $Z_0$ and then received by an input impedance $Z_{RX1}$ of the reception circuit RX1 as a third data signal. Please refer to FIG. 2B. FIG. 2B illustrates waveform diagrams of the second data signal and the third data signal. As shown in FIG. 2B, when the output impedance $Z_{TX1}$, the channel impedance $Z_0$, the input impedance $Z_{RX1}$ achieve impedance matching (that is, the channel has the same impedance as the transmission circuit TX1 and the reception circuit RX1, such as characteristic impedance, thereby preventing the reflection of the data signal), the third data signal has almost no attenuation compared to the second data signal. On the other hand, when the output impedance $Z_{TX1}$, the channel impedance $Z_0$ and the input impedance $Z_{RX1}$ do not achieve impedance matching, the third data signal may be significantly attenuated during state transition. In short, when the second data signal is transmitted to the input terminal of the reception circuit RX1 through the channel, the impedance matching conditions must be considered. As mentioned above, when impedance matching is achieved, the signal attenuation on the input terminal of the reception circuit RX1 is minimum. In other words, the third data signal and the second data signal are substantially the same. However, when impedance matching is not achieved, the data signal received on the input terminal of the reception circuit RX1 may be significantly attenuated. It should be noted that, for the sake of simplicity, only the characteristics and waveforms of the third data signal are used for illustration in the following embodiments and drawings.

It should be noted that, as shown in FIG. 2B, when the signal does not transition, even if the output impedance $Z_{TX1}$, the channel impedance $Z_0$ and the input impedance $Z_{RX1}$ do not achieve impedance matching, the third data signal is not attenuated. Therefore, the present invention utilizes the matching status of the output impedance $Z_{TX1}$, the channel impedance $Z_0$ and the input impedance $Z_{RX1}$ to reduce the power consumption of the transmission circuit TX1.

Figure 3:
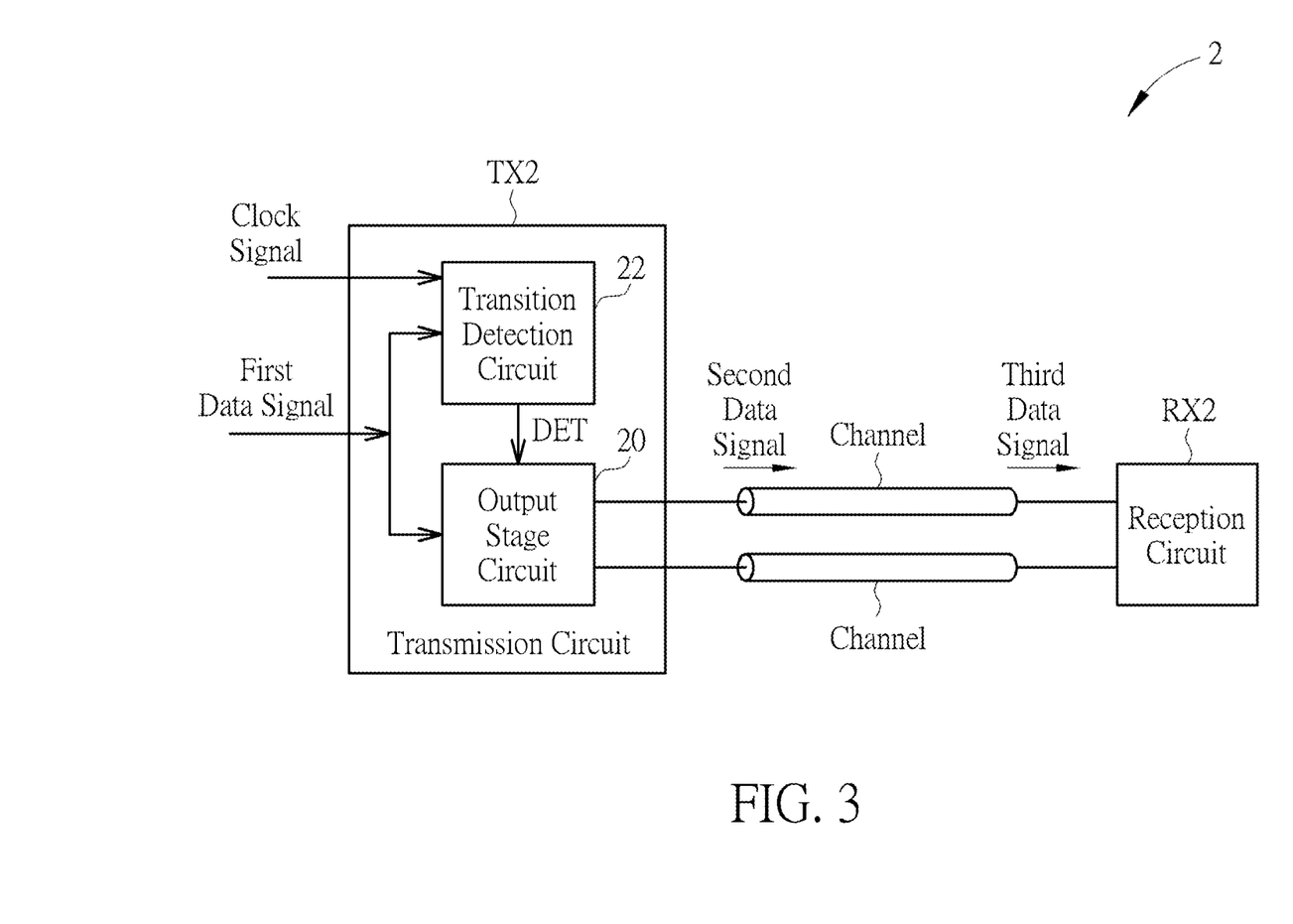
FIG. 3 is a schematic diagram of a transmission and reception system according to an embodiment of the present invention.

Please refer to FIG. 3. FIG. 3 is a schematic diagram of a transmission and reception system 2 according to an embodiment of the present invention. The transmission and reception system 2 includes a channel, a reception circuit RX2 and a transmission circuit TX2. It should be noted that, in some embodiments, the transmission and reception system 2 may be, but is not limited to, the SerDes system. For the sake of simplicity, the serializer and the deserializer are not shown in the following embodiments and drawings. The transmission circuit TX2 is configured to transmit the data signal to the reception circuit RX2 through the channel. The transmission circuit TX2 includes an output stage circuit 20 and a transition detection circuit 22. The output stage circuit 20 includes a variable output impedance circuit and a driving circuit, wherein the variable output impedance circuit is coupled to the channel and the driving circuit is coupled to the variable output impedance circuit. In detail, when the transmission circuit TX2 receives a first data signal, the transition detection circuit 22 may detect whether the first data signal transitions according to the clock signal, and generate a detection result DET to adjust the variable output impedance circuit. It should be noted that the first data signal is related to the clock signal. For example, as shown in FIG. 1, the clock signal may be generated by the PLL circuit 12. The serializer 10 may convert the parallel data signal into the serial first data signal according to the clock signal, but is not limited thereto. In this way, the driving circuit may output a second data signal according to the first data signal through the adjusted variable output impedance circuit. In detail, when the detection result DET indicates that the first data signal has transitioned, the transition detection circuit 22 may adjust the variable output impedance circuit to achieve impedance matching with the channel impedance $Z_0$ and the input impedance $Z_{RX1}$ of the reception circuit RX2. Under this circumstance, the output stage circuit 20 outputs the second data signal in a standard mode, and the third data signal is not attenuated. In contrast, as shown in FIG. 2B, even if the output impedance $Z_{TX1}$, the channel impedance $Z_0$ and the input impedance $Z_{RX1}$ do not achieve impedance matching, the third data signal is not attenuated when there is no transition. Therefore, when the detection result DET indicates that the first data signal does not transition, the transition detection circuit 22 may adjust the variable output impedance circuit to reduce the power consumption of the output stage circuit. Under this circumstance, the output stage circuit 20 outputs the second data signal in a power saving mode.

In short, in the transmission and reception system 2, when the transition detection circuit 22 detects that the first data signal does not transition, the embodiment of the present invention may optimize the variable output impedance circuit to reduce the power consumption of the output stage circuit 20 of the transmission circuit TX2.

Figure 4:
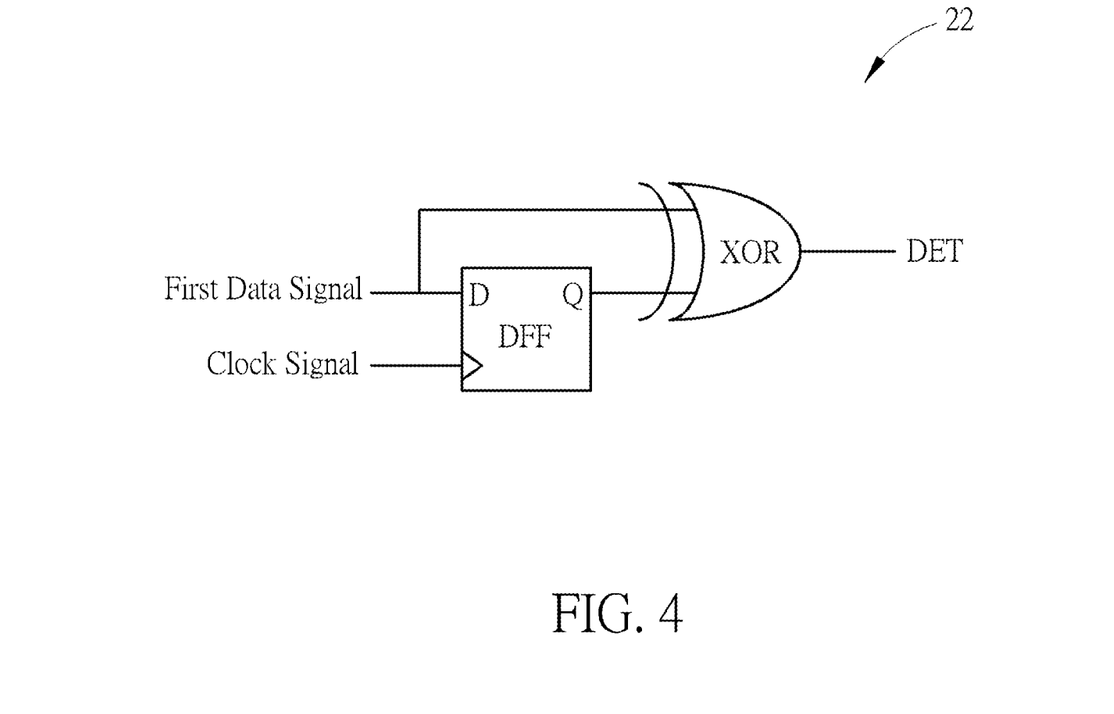
FIG. 4 is a schematic diagram of a transition detection circuit according to an embodiment of the present invention.

It should be noted that the detection result DET is a signal which is generated by the transition detection circuit 22 and corresponds to whether the first data signal transitions, and its form is not limited. Those skilled in the art may make appropriate adjustments according to the system requirements. For example, the transition detection circuit 22 may be implemented by a D flip-flop DFF and an exclusive OR gate XOR. As shown in FIG. 4, the D flip-flop DFF detects the first data signal during every time period related to the clock signal, and the exclusive OR gate XOR determines whether the first data signal transitions (for example, from a logic high state to a logic low state, or from a logic low state to a logic high state) during every time period. It should be noted that the operating principles of the D flip-flop DFF and the exclusive OR gate XOR are well known in the art and not repeated here.

In addition, the detection result DET output by the transition detection circuit 22 in FIG. 4 is a digital signal. Therefore, the variable output impedance circuit may be implemented by a plurality of resistors and a plurality of corresponding switches. The detection result DET may control whether the plurality of switches conduct the plurality of resistors respectively, to determine whether the output stage circuit 20 outputs the second data signal in the standard mode or the power saving mode.

Figure 5A:
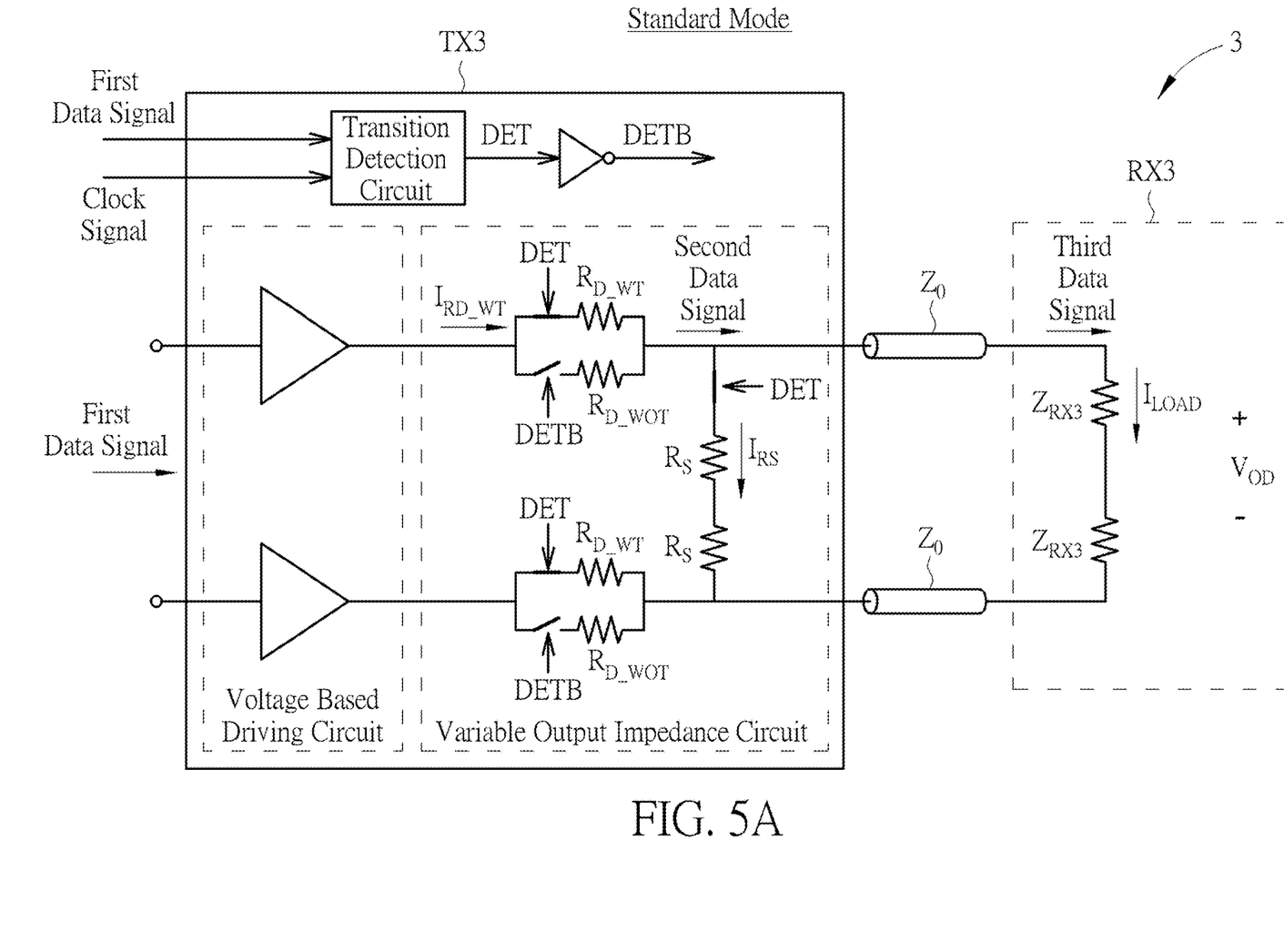
FIG. 5A and FIG. 5B are schematic diagrams of an equivalent circuit of a transmission and reception system according to an embodiment of the present invention.
Figure 5B:
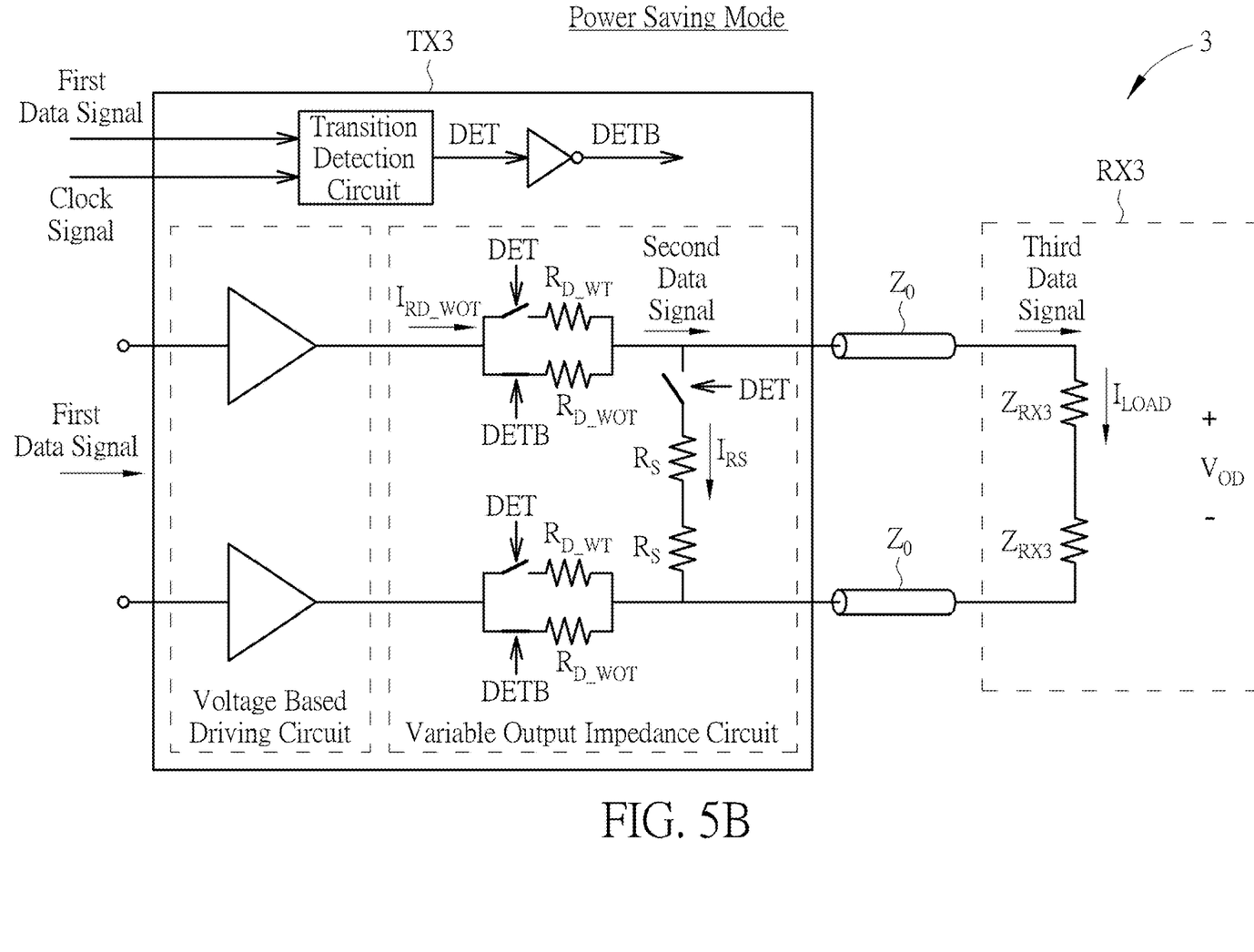

In an embodiment, please refer to FIG. 5A and FIG. 5B. FIG. 5A and FIG. 5B are equivalent circuits of a transmission circuit TX3, the channel and a reception circuit RX3 of a transmission and reception system 3 according to an embodiment of the present invention. As shown in FIG. 5A and FIG. 5B, the variable output impedance circuit is implemented by the standard mode resistor $R_{D\_WT}$, the power saving mode resistor $R_{D\_WOT}$, the matching resistor $R_S$ and corresponding switches thereof. It should be noted that the channel includes a positive terminal channel and a negative terminal channel, and the driving circuit includes a positive output terminal and a negative output terminal to drive the positive terminal channel and the negative terminal channel respectively. In other words, the transmission and reception system 3 performs the transmission through the differential signals. The operating principle of the differential signaling is well known in the art and not described herein. Specifically, the matching resistor $R_S$ and the corresponding switch are coupled in series between the positive terminal channel and the negative terminal channel. The standard mode resistors $R_{D\_WT}$ (coupled in series with the corresponding switches) and the power saving mode resistors $R_{D\_WOT}$ (coupled in series with the corresponding switches) are coupled in parallel between the positive output terminal and the positive terminal channel, and coupled in parallel between the negative output terminal and the negative terminal channel as well. In this way, the variable output impedance circuit may control the switches to be turned on or turned off according to the detection result DET so that the transmission circuit TX3 may be operated in the standard mode or the power saving mode. As shown in FIG. 5A, when the transmission circuit TX3 outputs the second data signal in the standard mode (the first data signal transitions), the detection result DET is used to turn on the switches corresponding to the standard mode resistor $R_{D\_WT}$ and the matching resistor $R_S$, and to turn off the switch corresponding to the power saving mode resistor $R_{D\_WOT}$. In other words, the positive output terminal and the negative output terminal of the driving circuit drive the positive terminal channel and the negative terminal channel through the standard mode resistor $R_{D\_WT}$. In this way, the transmission and reception system 3 may select resistances of the standard mode resistor $R_{D\_WT}$ and the matching resistor $R_S$ to achieve impedance matching with the channel impedance $Z_0$ and the input impedance $Z_{RX3}$. Under this circumstance, an amplitude of the second data signal and an amplitude of the third data signal are substantially the same. On the other hand, as shown in FIG. 5B, when the transmission circuit TX3 outputs the second data signal in the power saving mode (the first data signal does not transition), the detection result DET is used to turn off the switches corresponding to the standard mode resistor $R_{D\_WT}$ and the matching resistor $R_S$ and to turn on the switch corresponding to the power saving mode resistor $R_{D\_WOT}$. In other words, the positive output terminal and the negative output terminal of the driving circuit drive the positive terminal channel and the negative terminal channel through the power saving mode resistor $R_{D\_WOT}$. Under this circumstance, even if the power saving mode resistor $R_{D\_WOT}$ does not achieve impedance matching with the channel impedance $Z_0$ and the input impedance $Z_{RX3}$, the third data signal is almost not attenuated. It should be noted that when the transmission circuit TX3 outputs the second data signal in the standard mode, the driving current $I_{RD\_WT}$ provided by the transmission circuit TX3 flows into the matching resistor $R_S$ and the input impedance $Z_{RX3}$ respectively. When the transmission circuit TX3 outputs the second data signal in the power saving mode, the driving current $I_{RD\_WOT}$ provided by the transmission circuit TX3 only flows into the input impedance $Z_{RX3}$. In this way, the present invention may appropriately select the resistances of the standard mode resistor $R_{D\_WT}$, the power saving mode resistor $R_{D\_WOT}$ and the matching resistor $R_S$, so that the driving current $I_{RD\_WOT}$ of the transmission circuit TX3 operating in the power saving mode is lower than the driving current $I_{RD\_WT}$ in the standard mode, and thus the power consumption is reduced. The resistance of the power saving mode resistor $R_{D\_WOT}$ is greater than the resistance of the standard mode resistor $R_{D\_WT}$. In addition, no matter when the transmission circuit TX3 outputs the second data signal in the standard mode or in the power saving mode, the current $I_{LOAD}$ flowing into the input impedance $Z_{RX3}$ of the reception circuit RX3 needs to remain constant, so that an amplitude $V_{OD}$ of the received signal of the reception circuit RX3 remains substantially the same.

For example, in an embodiment, assuming that the input impedance $Z_{RX3}$ is 50Ω, the driving voltage of the transmission circuit TX3 is 0.9V, and an amplitude $V_{OD}$ of the received signal of the reception circuit RX2 is required to be 200 mV, when the transmission circuit TX3 outputs the second data signal in the standard mode, the embodiment of the present invention may determine that the standard mode resistor $R_{D\_WT}$ is 112Ω and the matching resistor $R_s$ is 90Ω, so that the variable output impedance circuit achieves impedance matching with the channel impedance $Z_0$ and the input impedance $Z_{RX3}$. Under this circumstance, the current $I_{LOAD}$ is 2 mA and the current flowing into the matching resistor $R_S$ is 1.11 mA. In other words, when the transmission circuit TX3 outputs the second data signal in the standard mode, the driving current $I_{RD\_WT}$ provided by the transmission circuit TX3 is 3.11 mA. On the other hand, when the transmission circuit TX3 outputs the second data signal in the power saving mode, the embodiment of the present invention may determine that the power saving mode resistor $R_{D\_WOT}$ is 175Ω. Under this circumstance, since the standard mode resistor $R_{D\_WT}$ and the matching resistor $R_S$ have been turned off, the driving current $I_{RD\_WOT}$ provided by the transmission circuit TX3 completely flows into the input impedance $Z_{RX3}$ when the transmission circuit TX3 outputs the second data signal in the power saving mode; that is, the driving current $I_{RD\_WOT}$ and the current $I_{LOAD}$ are both 2 mA. In short, compared with the transmission circuit TX1 of the conventional SerDes system 1 which transmits the data signal in the standard mode throughout the entire signal transmission process, the transmission and reception system 3 of the embodiment of the present invention switches to the power saving mode to transmit the first data signal when the first data signal does not transition, and remains an amplitude $V_{OD}$ of the received signal to be substantially the same. Therefore, when the first data signal does not transition, the driving current of the transmission circuit TX3 is reduced from 3.11 mA to 2 mA, which is a decrease of 35%. It should be noted that because the effect of the channel impedance is small at low frequency, the channel impedance is ignored to simplify the analysis in the above embodiments for the sake of clarity. However, in actual situations, those skilled in the art may appropriately adjust the impedance value according to the system requirements.

Figure 6A:
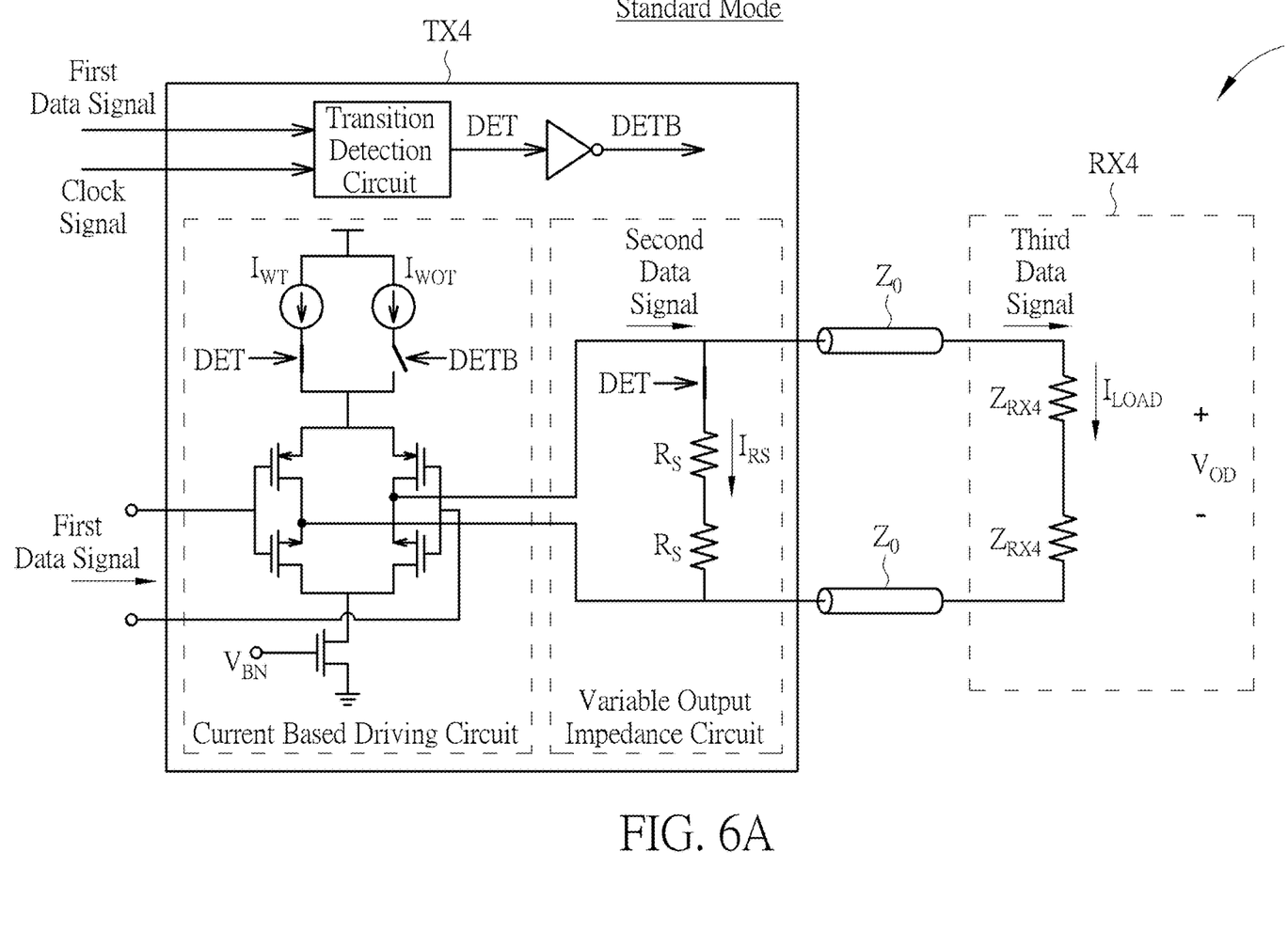
FIG. 6A and FIG. 6B are schematic diagrams of an equivalent circuit of a transmission and reception system according to another embodiment of the present invention.
Figure 6B:
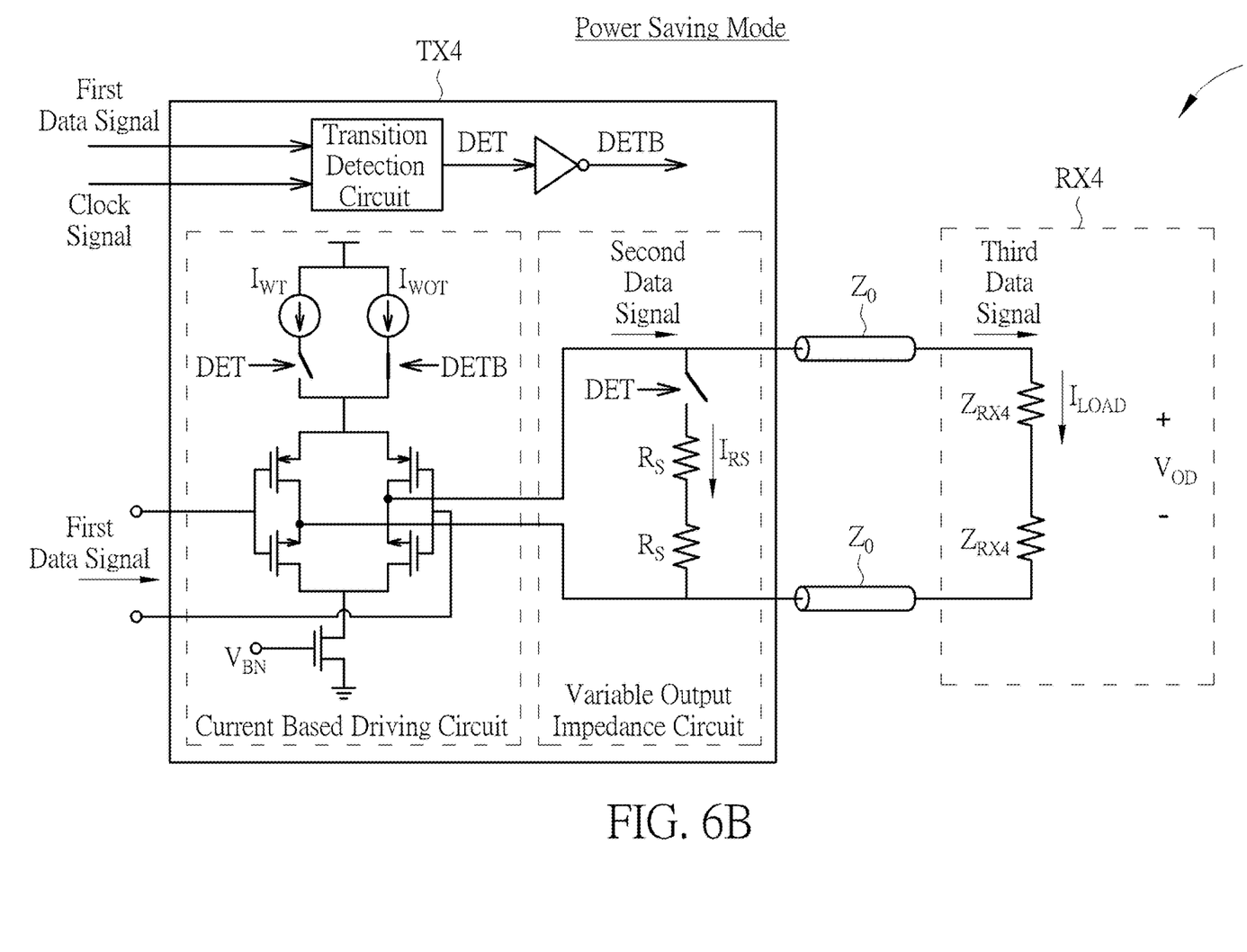

It should be noted that FIG. 5A and FIG. 5B are only embodiments of the present invention, and those skilled in the art may make appropriate adjustments according to the system requirements. For example, the driving circuit of FIG. 5A and FIG. 5B is a voltage based driving circuit, and another suitable driving circuit for the present invention may be a current based driving circuit. Please refer to FIG. 6A and FIG. 6B. FIG. 6A and FIG. 6B illustrate an equivalent circuit of a transmission circuit TX4, the channel and a reception circuit RX4 of a transmission and reception system 4 according to an embodiment of the present invention. The variable output impedance circuit includes the matching resistor $R_S$ and the corresponding switches thereof. The current based driving circuit includes the standard mode current source $I_{WT}$, the power saving mode current source $I_{WOT}$ and the corresponding switches thereof. The channel includes the positive terminal channel and the negative terminal channel. Specifically, the matching resistor $R_S$ and the corresponding switch are coupled in series between the positive terminal channel and the negative terminal channel, the standard mode current source $I_{WT}$ (coupled in series with the corresponding switch) and the power saving mode current source $I_{WOT}$ (coupled in series with the corresponding switch) are coupled in parallel to provide the driving current to the positive terminal channel and the negative terminal channel. In this way, the variable output impedance circuit may control the switches to be turned on or turned off according to the detection result DET so that the transmission circuit TX3 may be operated in the standard mode or the power saving mode. As shown in FIG. 6A, when the transmission circuit TX4 outputs the second data signal in the standard mode (the first data signal transitions), the detection result DET is used to turn on the switches corresponding to the standard mode current source $I_{WT}$ and the matching resistor $R_S$, and to turn off the switch corresponding to the power saving mode current source $I_{WOT}$. In other words, the positive output terminal and the negative output terminal of the driving circuit provide the driving current through the standard mode current source $I_{WT}$, so as to drive the positive terminal channel and the negative terminal channel. In this way, the transmission and reception system 4 may select the resistance of the matching resistor $R_S$ to achieve impedance matching with the channel impedance $Z_0$ and the input impedance $Z_{RX4}$. Under this circumstance, an amplitude of the second data signal and an amplitude of the third data signal are substantially the same. On the other hand, as shown in FIG. 6B, when the transmission circuit TX4 outputs the second data signal in the power saving mode (the first data signal does not transition), the detection result DET is used to turn off the switches corresponding to the standard mode current source $I_{WT}$ and the matching resistor $R_S$, and to turn on the switch corresponding to the power saving mode current source $I_{WOT}$. In other words, the positive output terminal and the negative output terminal of the driving circuit provide the driving current through the power saving mode current source $I_{WOT}$, so as to drive the positive terminal channel and the negative terminal channel. Under this circumstance, even if the transmission circuit TX4 does not achieve impedance matching with the channel impedance $Z_0$ and the input impedance $Z_{RX4}$, the third data signal is almost not attenuated. It should be noted that when the transmission circuit TX4 outputs the second data signal in the standard mode, the driving current from the standard mode current source $I_{WT}$ flows into the matching resistor $R_S$ and the input impedance $Z_{RX4}$ respectively. When the transmission circuit TX4 outputs the second data signal in the power saving mode, the driving current from the power saving mode current source $I_{WOT}$ provided by the transmission circuit TX4 only flows into the input impedance $Z_{RX4}$. In this way, the present invention may make the driving current of the transmission circuit TX4 operating in the power saving mode lower than the driving current operating in the standard mode by appropriately selecting the standard mode current source $I_{WT}$, the power saving mode current source $I_{WOT}$ and the resistances of the matching resistor $R_S$, so as to reduce the power consumption. Note that, the current value of the power saving mode current source $I_{WOT}$ is smaller than the current value of the standard mode current source $I_{WT}$. In addition, in order to maintain an amplitude $V_{OD}$ of the received signal of the reception circuit RX4, the current $I_{LOAD}$ flowing into the input impedance $Z_{RX4}$ shall remain constant when the transmission circuit TX4 outputs the second data signal in the standard mode and the power saving mode.

For example, in an embodiment, assuming the input impedance $Z_{RX4}$ is 50Ω and an amplitude $V_{OD}$ of the received signal of the reception circuit RX4 is required to be 200 mV, when the transmission circuit TX4 outputs the second data signal in the standard mode, the embodiment of the present invention may determine that the driving current provided by the standard mode current source $I_{WT}$ is 4 mA and the matching resistor $R_S$ is 50Ω, so that the variable output impedance circuit achieves impedance matching with the channel impedance $Z_0$ and the input impedance $Z_{RX4}$. Under this circumstance, the current $I_{LOAD}$ is 2 mA and the current flowing into the matching resistor $R_S$ is also 2 mA. On the other hand, since the switch corresponding to the matching resistor $R_S$ has been turned off when the transmission circuit TX4 outputs the second data signal in the power saving mode, the embodiment of the present invention may determine that the driving current provided by the power saving mode current source $I_{WOT}$ is 2 mA. Under this circumstance, the driving current provided by the power saving mode current source $I_{WOT}$ completely flows into the input impedance $Z_{RX4}$; that is, the driving current provided by the power saving mode current source $I_{WOT}$ and the current $I_{LOAD}$ are both 2 mA. In short, compared with the transmission circuit TX1 of the conventional SerDes system 1 which transmits the data signal in the standard mode throughout the entire signal transmission process, the transmission and reception system 4 of the embodiment of the present invention adopts the current based driving circuit and switches to the power saving mode to transmit the first data signal when the first data signal does not transition, and remains an amplitude $V_{OD}$ of the received signal to be substantially the same. Therefore, when the first data signal does not transition, the driving current of the current based driving circuit in the embodiment of the present invention is reduced from 4 mA to 2 mA, which is a decrease of 50%.

It should be noted that the transmission and reception system 2-4 are different embodiments of the present invention, and those skilled in the art may make appropriate adjustments according to the system requirements, but is not limited thereto. Specifically, the transition detection circuit 22 of the present invention may be configured to detect whether a signal transition occurs in one time period or a plurality of consecutive time periods, and the variable output impedance circuit is accordingly adjusted to reduce the power consumption of the output stage circuit of the transmission circuit TX2. For example, as shown in FIG. 2B, when the output impedance $Z_{TX1}$, the channel impedance $Z_0$ and the input impedance $Z_{RX1}$ achieve impedance matching, the third data signal does not transition during the first time period (1st TP) and the subsequent second time period (2nd TP). Therefore, the transition detection circuit 22 of the present invention may be implemented with other logic gates, and is configured to adjust the variable output impedance circuit in the second time period when detecting that the first data signal does not transition during two consecutive time periods, to reduce the power consumption of the output stage circuit of the transmission circuit TX2. In addition, in the case where the driving circuit is the current based driving circuit and the transition detection circuit 22 detects that the first data signal does not transition during two consecutive time periods, the transition detection circuit 22 may adjust the driving current of the current based driving circuit in the second time period to reduce the power consumption. In short, when the transition detection circuit 22 of the present invention detects that there is no transition during any time period, the transition detection circuit 22 waits for one more time period before controlling the transmission and reception systems 2-4 to enter the power saving mode. In addition, if the transition detection circuit 22 detects a transition during any time period, the transition detection circuit 22 immediately controls the transmission and reception systems 2-4 to enter the standard mode, to avoid the data signal to be attenuated. It should be noted that the transition detection circuit 22 of the present invention may detect that the first data signal does not transition during two consecutive time periods, but is not limited thereto, and those skilled in the art may make appropriate adjustments according to the system requirements.

Figure 7:
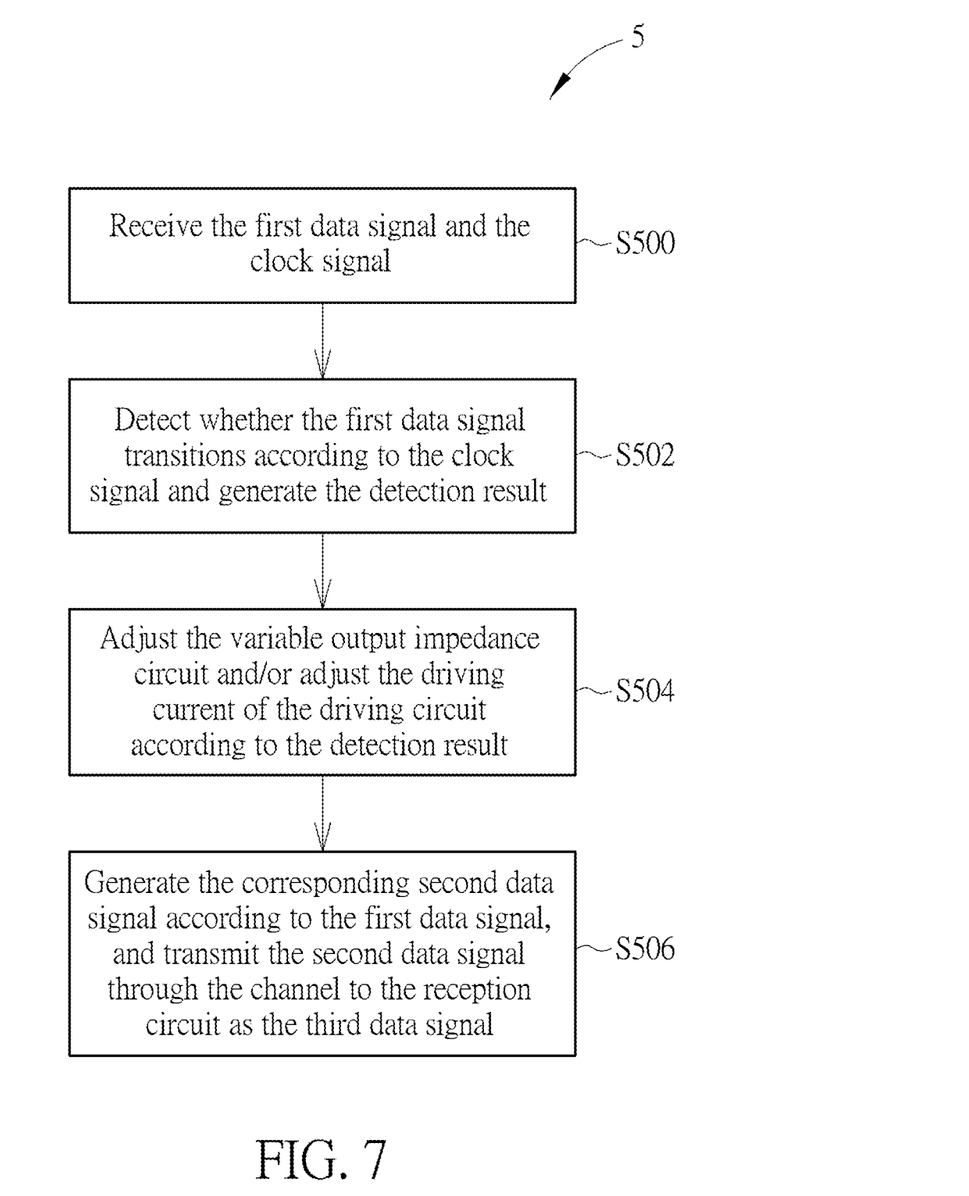
FIG. 7 is a flowchart of the transmission method according to an embodiment of the present invention.

Please refer to FIG. 7. FIG. 7 illustrates a transmission method 5 according to an embodiment of the present invention. The transmission method 5 may be applied to the above-mentioned transmission and reception systems 2-4 in FIGS. 3-6B, and is not limited thereto. The transmission method 5 includes the following steps:

Step S500: Receive the first data signal and the clock signal having the time period. For example, the present invention may utilize the transmission circuit TX2 to receive the first data signal and the clock signal.

Step S502: Detect whether the first data signal transitions according to the clock signal and generate the detection result. The detection result may indicate the operating mode. For example, the present invention may utilize the transition detection circuit 22 to detect whether the first data signal transitions according to the clock signal, and generate the detection result DET. That is, the detection result DET is a signal utilized to indicate whether the first data signal transitions. Specifically, when the detection result DET indicates that the first data signal transitions (for example, logic high), the transmission circuit TX2 operates in the standard mode; when the detection result DET indicates that the first data signal does not transition (for example, logic low), the transmission circuit TX2 operates in the power saving mode. In an embodiment, when the first data signal does not transition during any time period of the clock signal, it is determined to enter the power saving mode. In another embodiment, when the first data signal does not transition during the plurality of consecutive time periods of the clock signal, it is determined to enter the power saving mode. It should be noted that when detecting that the first data signal transitions, it is determined to enter the standard mode.

Step S504: Adjust the variable output impedance circuit and/or adjust the driving current of the driving circuit according to the detection result; that is, adjust the characteristics of the transmission circuit. In the standard mode, the equivalent output impedance of the transmission circuit is adjusted to match the channel impedance and the input impedance of the reception circuit. In the power saving mode, the driving current of the transmission circuit is reduced. In addition, in both the standard mode and the power saving mode, an amplitude of the output signal of the transmission circuit is remained substantially the same. For example, in the voltage based driving embodiment in FIGS. 5A and 5B, when the detection result DET indicates that the first data signal transitions (the standard mode), the variable output impedance circuit is adjusted so that the equivalent output impedance of the variable output impedance circuit achieves impedance matching with the channel impedance $Z_0$ and the input impedance $Z_{RX3}$. In addition, when the detection result DET indicates that the first data signal does not transition (the power saving mode), the variable output impedance circuit is adjusted to reduce the driving current of the transmission circuit TX3. Specifically, in the power saving mode as shown in FIG. 5B, the switches corresponding to the standard mode resistor $R_{D\_WT}$ and the matching resistor $R_S$ may be turned off, and the switch corresponding to the power saving mode resistor $R_{D\_WOT}$ may be turned on, wherein the resistance of the power saving mode resistor $R_{D\_WOT}$ is greater than the resistance of the standard mode resistor $R_{D\_WT}$. On the other hand, in the current based driving embodiment as shown in FIGS. 6A, 6B, when the detection result DET indicates that the first data signal transitions (the standard mode), the variable output impedance circuit and the driving current of the driving circuit are adjusted so that the equivalent output impedance of the variable output impedance circuit achieves impedance matching with the channel impedance $Z_0$ and the input impedance $Z_{RX4}$. In addition, when the detection result DET indicates that the first data signal does not transition (the power saving mode), the variable output impedance circuit and the driving current of the driving circuit are adjusted to reduce the driving current of the transmission circuit TX4. Specifically, in the power saving mode as shown in FIG. 6B, the switches corresponding to the standard mode current source $I_{WT}$ and the matching resistor $R_S$ may be turned off, and the switch corresponding to the power saving mode current source $I_{WOT}$ may be turned on, wherein the current of the power saving mode current source $I_{WOT}$ is smaller than the current of the standard mode current source $I_{WT}$.

Step S506: Generate the corresponding second data signal according to the first data signal, and transmit the second data signal through the channel to the reception circuit as the third data signal. That is, the input terminal of the reception circuit receives the third data signal corresponding to the second data signal. Specifically, as shown in the voltage based driving embodiment in FIGS. 5A, 5B and the current based driving embodiment in FIGS. 6A, 6B, the second data signals generated by the transmission circuits TX3, TX4 are transmitted to the corresponding reception circuits RX3, RX4 through the channel and become the third data signal without attenuation, so an amplitude of the second data signal and an amplitude of the third data signal are substantially the same. And no matter the transmission circuits TX3, TX4 operate in the standard mode or the power saving mode, an amplitude of the second data signal remains substantially constant and thus an amplitude of the third data signal $V_{OD}$ of the corresponding reception circuits RX3, RX4 is substantially the same and not affected by the operating modes.

In short, in the above mentioned voltage based and current based driving signal transmission methods, the operating mode of the transmission circuit may be determined according to whether the first data signal (the input signal) transitions. When the transmission circuit operates in the standard mode, the equivalent output impedance of the transmission circuit may be matched with the channel impedance and the input impedance of the reception circuit to avoid the signal attenuation. When the transmission circuit operates in the power saving mode, the driving current of the transmission circuit may be adjusted to reduce the power consumption. In addition, no matter the transmission circuit operates in the standard mode or the power saving mode, an amplitude Von of the signal received by the reception circuit remains substantially the same, thereby meeting application requirements.

In summary, the transmission circuit, the transmission method and the transmission and reception system of the present invention may adjust the impedance value of the variable output impedance circuit and/or the driving current of the driving circuit when detecting that the data signal does not transition, and may maintain an amplitude of the received signal of the reception circuit. In this way, compared to the prior art, the adjustment function of the present invention may reduce the power consumption of the transmission and reception system while maintaining the amplitude of the received signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission circuit, for performing transmission with a reception circuit through a positive terminal channel and a negative terminal channel,
the transmission circuit comprising:
an output stage circuit, comprising:
a variable output impedance circuit, coupled to the positive terminal channel and the negative terminal channel; and
a driving circuit, comprising a positive output terminal and a negative output terminal, configured to output a second data signal through the variable output impedance circuit according to a first data signal, wherein the positive output terminal and the negative output terminal drive the positive terminal channel and the negative terminal channel respectively through the variable output impedance circuit;
a transition detection circuit, coupled to the output stage circuit, configured to detect whether the first data signal transitions from a logic high state to a logic low state, or from the logic low state to the logic high state according to a clock signal having a time period, and generate a detection result to adjust the variable output impedance circuit;
wherein the variable output impedance circuit comprises a matching resistor and a first switch, the matching resistor and the first switch are coupled in series between the positive terminal channel and the negative terminal channel, the transition detection circuit controls the first switch to be turned on or turned off according to the detection result;
when the detection result indicates that the first data signal transitions from the logic high state to the logic low state, or from the logic low state to the logic high state, the first switch is turned on; and
when the detection result indicates that the first data signal does not transition from the logic high state to the logic low state, or from the logic low state to the logic high state, the first switch is turned off.

2. The transmission circuit of claim 1, wherein the variable output impedance circuit further comprises a first standard mode resistor, a second standard mode resistor, a first power saving mode resistor and a second power saving mode resistor, the first standard mode resistor and the first power saving mode resistor are coupled in parallel between the positive output terminal and the positive terminal channel, the second standard mode resistor and the second power saving mode resistor are coupled in parallel between the negative output terminal and the negative terminal channel;
when the detection result indicates that the first data signal transitions from the logic high state to the logic low state, or from the logic low state to the logic high state, the transition detection circuit controls the positive output terminal to drive the positive terminal channel through the first standard mode resistor, and controls the negative output terminal to drive the negative terminal channel through the second standard mode resistor; and
when the detection result indicates that the first data signal does not transition from the logic high state to the logic low state, or from the logic low state to the logic high state, the transition detection circuit controls the positive output terminal to drive the positive terminal channel through the first power saving mode resistor, and controls the negative output terminal to drive the negative terminal channel through the second power saving mode resistor.

3. The transmission circuit of claim 2, wherein the first standard mode resistor and the second standard mode resistor both have a first resistance value, the first power saving mode resistor and the second power saving mode resistor both have a second resistance value, and the second resistance value is greater than the first resistance value.

4. The transmission circuit of claim 1, wherein the driving circuit further comprises a standard mode current source and a power saving mode current source, the standard mode current source and the power saving mode current source are coupled in parallel to provide a driving current to the positive terminal channel and the negative terminal channel;
when the detection result indicates that the first data signal transitions from the logic high state to the logic low state, or from the logic low state to the logic high state, the transition detection circuit controls a path of the standard mode current source to be conducted and a path of the power saving mode current source to be cut off, and the driving circuit provides the driving current through the standard mode current source; and
when the detection result indicates that the first data signal does not transition from the logic high state to the logic low state, or from the logic low state to the logic high state, the transition detection circuit controls the path of the standard mode current source to be cut off and the path of the power saving mode current source to be conducted, and the driving circuit provides the driving current through the power saving mode current source.

5. The transmission circuit of claim 4, wherein the standard mode current source has a first current value, the power saving mode current source has a second current value, and the second current value is smaller than the first current value.

6. The transmission circuit of claim 1, wherein when the first data signal transitions from the logic high state to the logic low state, or from the logic low state to the logic high state during any time period, the transition detection circuit sets the detection result in a first state to indicate that the transmission circuit operates in a standard mode; and
when the first data signal does not transition from the logic high state to the logic low state, or from the logic low state to the logic high state during any time period, the transition detection circuit sets the detection result in a second state to indicate that the transmission circuit operates in a power saving mode.

7. The transmission circuit of claim 6, wherein an amplitude of the second data signal when the transmission circuit operates in the standard mode and an amplitude of the second data signal when the transmission circuit operates in the power saving mode are substantially the same.

8. The transmission circuit of claim 1, wherein when the first data signal transitions from the logic high state to the logic low state, or from the logic low state to the logic high state during any time period, the transition detection circuit sets the detection result in a first state to indicate that the transmission circuit operates in a standard mode; and
when the first data signal does not transition from the logic high state to the logic low state, or from the logic low state to the logic high state during a plurality of consecutive time periods, the transition detection circuit sets the detection result in a second state to indicate that the transmission circuit operates in a power saving mode.

9. The transmission circuit of claim 8, wherein an amplitude of the second data signal when the transmission circuit operates in the standard mode and an amplitude of the second data signal when the transmission circuit operates in the power saving mode are substantially the same.

10. A transmission and reception system, comprising:
a transmission circuit, comprising:
an output stage circuit, comprising:
a variable output impedance circuit, coupled to a positive terminal channel and a negative terminal channel; and
a driving circuit, comprising a positive output terminal and a negative output terminal, configured to output a second data signal through the variable output impedance circuit according to a first data signal, wherein the positive output terminal and the negative output terminal drive the positive terminal channel and the negative terminal channel respectively through the variable output impedance circuit; and
a transition detection circuit, coupled to the output stage circuit, configured to detect whether the first data signal transitions from a logic high state to a logic low state, or from the logic low state to the logic high state according to a clock signal having a time period, and generate a detection result to adjust the variable output impedance circuit;
wherein the variable output impedance circuit comprises a matching resistor and a first switch, the matching resistor and the first switch are coupled in series between the positive terminal channel and the negative terminal channel, the transition detection circuit controls the first switch to be turned on or turned off according to the detection result;
when the detection result indicates that the first data signal transitions from the logic high state to the logic low state, or from the logic low state to the logic high state, the first switch is turned on; and
when the detection result indicates that the first data signal does not transition from the logic high state to the logic low state, or from the logic low state to the logic high state, the first switch is turned off;
a reception circuit, configured to receive a third data signal; and
a channel, comprising the positive terminal channel and the negative terminal channel, coupled between the transmission circuit and the reception circuit, configured to transmit the second data signal output by the variable impedance circuit of the transmission circuit to the reception circuit as the third data signal through the channel.

11. The transmission and reception system of claim 10, wherein an amplitude of the second data signal when the transmission circuit operates in a standard mode and an amplitude of the third data signal when the transmission circuit operates in the standard mode are substantially the same, and an amplitude of the second data signal when the transmission circuit operates in a power saving mode and an amplitude of the third data signal when the transmission circuit operates in the power saving mode are substantially the same.

12. A transmission method, for a transmission circuit, wherein the transmission circuit transmits signals to a reception circuit through a positive terminal channel and a negative terminal channel, the transmission method comprising:
receiving a first data signal and a clock signal having a time period;
detecting whether the first data signal transitions from a logic high state to a logic low state, or from the logic low state to the logic high state and generating a detection result according to the clock signal;
adjusting characteristics of the transmission circuit according to the detection result; and
outputting a second data signal according to the first data signal, and transmitting the second data signal to the reception circuit as a third data signal through the positive terminal channel and the negative terminal channel:
wherein the step of adjusting the characteristics of the transmission circuit according to the detection result comprises:
when the detection result indicates that the first data signal transitions from the logic high state to the logic low state, or from the logic low state to the logic high state, adjusting an equivalent output impedance of the transmission circuit, to achieve impedance matching of the transmission circuit, the positive terminal channel, the negative terminal channel and the reception circuit; and
when the detection result indicates that the first data signal does not transition from the logic high state to the logic low state, or from the logic low state to the logic high state, decreasing a driving current of the transmission circuit.

13. The transmission method of claim 12, wherein the step of detecting whether the first data signal transitions from the logic high state to the logic low state, or from the logic low state to the logic high state and generating the detection result according to the clock signal comprises:

when the first data signal transitions from the logic high state to the logic low state, or from the logic low state to the logic high state during any time period, setting the detection result in a first state to indicate that the transmission circuit operates in a standard mode; and when the first data signal does not transition from the logic high state to the logic low state, or from the logic low state to the logic high state during any time period, setting the detection result in a second state to indicate that the transmission circuit operates in a power saving mode.

14. The transmission method of claim 13, wherein an amplitude of the second data signal when the transmission circuit operates in the standard mode and an amplitude of the second data signal when the transmission circuit operates in the power saving mode are substantially the same; and the amplitude of the second data signal when the transmission circuit operates in the standard mode and an amplitude of the third data signal when the transmission circuit operates in the standard mode are substantially the same, and the amplitude of the second data signal when the transmission circuit operates in the power saving mode and an amplitude of the third data signal when the transmission circuit operates in the power saving mode are substantially the same.

15. The transmission method of claim 12, wherein the step of detecting whether the first data signal transitions from the logic high state to the logic low state, or from the logic low state to the logic high state and generating the detection result according to the clock signal comprises:

when the first data signal transitions from the logic high state to the logic low state, or from the logic low state to the logic high state during any time period, setting the detection result in a first state to indicate that the transmission circuit operates in a standard mode; and when the first data signal does not transition from the logic high state to the logic low state, or from the logic low state to the logic high state during a plurality of consecutive time periods, setting the detection result in a second state to indicate that the transmission circuit operates in a power saving mode.

16. The transmission method of claim 15, wherein an amplitude of the second data signal when the transmission circuit operates in the standard mode and an amplitude of the second data signal when the transmission circuit operates in the power saving mode are substantially the same; and the amplitude of the second data signal when the transmission circuit operates in the standard mode and an amplitude of the third data signal when the transmission circuit operates in the standard mode are substantially the same, and the amplitude of the second data signal when the transmission circuit operates in the power saving mode and an amplitude of the third data signal when the transmission circuit operates in the power saving mode are substantially the same.

* * * * *